United States Patent
Hasenzahl

(10) Patent No.: US 8,630,734 B2
(45) Date of Patent: Jan. 14, 2014

(54) METHOD AND AUTOMATED MANIPULATOR FOR MOVING A PERSON WITH THE MANIPULATOR

(75) Inventor: Torsten Hasenzahl, Dillingen (DE)

(73) Assignee: Kuka Laboratories GmbH, Augsburg (DE)

( * ) Notice: Subject to any disclaimer, the term of this patent is extended or adjusted under 35 U.S.C. 154(b) by 655 days.

(21) Appl. No.: 12/770,874

(22) Filed: Apr. 30, 2010

(65) Prior Publication Data

US 2010/0280660 A1  Nov. 4, 2010

(30) Foreign Application Priority Data

Apr. 30, 2009 (DE) .......................... 10 2009 019 633

(51) Int. Cl.
*G06F 19/00* (2011.01)

(52) U.S. Cl.
USPC ........... 700/245; 700/253; 700/255; 700/257; 700/262; 472/27; 472/28; 472/35; 472/36; 318/568.11; 318/568.12

(58) Field of Classification Search
USPC .......................... 700/245, 253, 255, 257, 262; 318/568.11, 568.12, 568.13, 568.16, 318/568.18, 568.19; 434/29, 30, 33, 35; 472/7, 27, 28, 35, 36, 59, 60
See application file for complete search history.

(56) References Cited

U.S. PATENT DOCUMENTS

| | | | |
|---|---|---|---|
| 4,431,182 A | | 2/1984 | Reynolds |
| 5,453,011 A | * | 9/1995 | Feuer et al. ................. 434/38 |
| 5,595,121 A | * | 1/1997 | Elliott et al. ................. 104/53 |
| 5,768,122 A | * | 6/1998 | Motoc ......................... 700/50 |
| 5,791,903 A | * | 8/1998 | Feuer et al. ................. 434/38 |
| 6,406,299 B1 | * | 6/2002 | Murao et al. ................ 434/29 |
| 6,776,722 B2 | | 8/2004 | De-Gol |
| 6,871,596 B2 | * | 3/2005 | De-Gol ......................... 104/53 |
| 7,321,799 B2 | * | 1/2008 | Paillard ........................ 700/9 |
| 2004/0029094 A1 | * | 2/2004 | McGraw ..................... 434/365 |
| 2007/0009861 A1 | * | 1/2007 | Heinrich ..................... 434/29 |

FOREIGN PATENT DOCUMENTS

| | | |
|---|---|---|
| DE | 19900528 A1 * | 9/2000 |
| WO | 97/20280 | 6/1997 |
| WO | WO 2009/089561 | 7/2009 |

OTHER PUBLICATIONS

Bellmann et al., An Innovative Driving Simulator: Robocoaster, Sep. 2008, Proceedings of International conference FISITA 2008, pp. 1-8.*

Kecskemethy et al., Workspace Fitting and Control for a Serial-Robot Motion Simulator, Proceedings of EUCOMES 2008, The Second European Conference on Mechanism Science, DOI 10.1007/978-1-4020-8915-2 23, C Springer Science+Business Media B.V. 2009, pp. 183-190.*

(Continued)

*Primary Examiner* — Khoi Tran
*Assistant Examiner* — Jaime Figueroa
(74) *Attorney, Agent, or Firm* — Schiff Hardin LLP

(57) ABSTRACT

A method to move a person with an automated manipulator, in particular a robot, includes moving a rider receptacle for a person with the manipulator, and determining an acceleration variable of this movement before and/or during the execution of this movement and comparing the acceleration variable with a predetermined acceleration variable and/or adapting the movement to a predetermined acceleration variable in the event that the determined acceleration variable deviates from the predetermined acceleration variable, and/or a predetermined acceleration variable is used that includes different permissible acceleration durations that are respectively associated with a permissible acceleration value.

12 Claims, 1 Drawing Sheet

(56) References Cited

OTHER PUBLICATIONS

Niccolini et al., Towards Real-Time Aircraft Simulation with the MPI Motion Simulator, 2009, proceedings of the 2009 AIAA American Institute of Aeronautics and Astronautics Modeling and Simulation Technologies Conference, pp. 1-10.*

Teufel et al., MPI Motion Simulator: Development and Analysis of a Novel Motion Simulator, Aug. 20-23, 2007, AIAA Modeling and Simulation Technologies Conference and Exhibit, Hilton Head, South Carolina, pp. 1-11.*

Schaetzle et al., Workspace Optimization of the Robocoaster used as a Motion Simulator, Nov. 2-4, 2009, Proceedings of the 14$^{th}$ IASTED International Conference Robotics and Appliocations (RA 2009), Cambridge, MA, USA, pp. 470-477.*

Bellmann et al., Real-Time Path Planning for an interactive and industrial robot-based Motion Simulator, 2007, Proceedings of the 2nd Motion Simulator Conference, Braunschweig, Germany, pp. 1-16.*

"Novel Motion Platform for Flight Simulators Using an Anthoropomorphic Robot," Pollini et al., Journal of Aerospace Computing, Information, and Communication, vol. 5, No. 7, (Jul. 2008) pp. 175-175.

"Robot-Robot and Human-Robot Cooperation in Commerical Robotics Applications," Koeppe et al., Springer Tracts in Advanced Robotics, vol. 15 (2005) pp. 202-216.

Kuka Roboter GmbH Robocoaster Specification (2007).

* cited by examiner

METHOD AND AUTOMATED MANIPULATOR FOR MOVING A PERSON WITH THE MANIPULATOR

BACKGROUND OF THE INVENTION

1. Field of the Invention

The present invention concerns the movement of a person via a manipulator, in particular a robot.

2. Description of the Prior Art

EP 1 289 616 B1 discloses the use of robots to move persons. For this purpose, the robot supports a rider receptacle and moves this corresponding to a preplanned path or a path generated during the movement, in particular by the rider. In addition to industrial applications in which the person is brought by the robot into specific working (for example installation) positions, the field of entertainment in particular represents an advantageous usage possibility in which robots can replace or supplement conventional amusement rides.

In such rides, high accelerations are desired in part in order to stimulate the sense of balance of the riders, but it must be ensured that allowable maximum acceleration values are not exceeded.

It is known to limit acceleration in such circumstances by limitation of the drive outputs and selection of the gearing ratios so that, even in the most disadvantageous poses of the robot, a permissible maximum acceleration value is not exceeded at maximum motor moments.

EP 1 289 616 B1 proposes a safety device (not specified in detail) to limit an acceleration force

SUMMARY OF THE INVENTION

The above solutions are still not optimal from various points of view. It is therefore the object of the present invention to improve the movement of a person via a manipulator, in particular in the field of entertainment.

A manipulator according to the invention can be fashioned as a robot that has one or more (advantageously at least six) movement axes, in particular rotation and/or linear axes, for example an articulated arm, Portal or SCARA robot, a linear axis or a robot mounted on a movable platform. It has a rider receptacle for one or more persons—for example a seat, a bank of seats, a suspended frame or belt, a standing platform or the like—and actuators to move the rider receptacle, for example electromotors that act on movement axes of the manipulator.

A path or trajectory that is to be traversed or followed can be generated, for example, by means of an offline path planning or (at least in segments) during the operation, for example by an interpolator on the basis of nodes that (that are stored in advance) or are provided by a rider, an operator or a manipulator controller, for example on the basis of the positions of obstacles such as other manipulators or the like. A series $(r(s_i), \psi(s_i))$ i=0, 1, ... of positions—i.e. orientations, for example Cartesian coordinates r=(x, y, z)—and/or orientations—for example EULER or KARDAN angles LP=($\alpha$, $\beta$, $\gamma$)—or a series of associated joint positions of the manipulator is thereby designated as a path or trajectory. The traversal of a trajectory in the time period—for example a curve (r(t), $\psi$(t)) or a path profile s(t)—is accordingly designated as a movement.

According to the invention, an acceleration variable is determined for the movement of the rider receptacle. This acceleration variable can be an acceleration value, for example the absolute value $$\left| \frac{d^2 r}{dt^2} \right|$$

of the acceleration of a reference point of the rider receptacle or its component in a predetermined direction, for example perpendicular to the rider receptacle (i.e. upward/downward, forward/backward or left/right in a relative system of the rider receptacle). The acceleration value can be defined by an algebraic sign since, for example, what are known as negative (in particular cranial or posterior) accelerations, i.e. upward or backward in a reference system of the rider receptacle, are harder to tolerate than positive accelerations (in particular caudal or anterior) accelerations, i.e. downward or forward.

Acceleration values can be normalized with gravitation acceleration ($g \approx 9.81$ m/s$^2$) and then represent the acting g-forces. The corresponding components of gravitational acceleration can thereby be taken into account that—together with the accelerations relative to the inertial system referenced to the earth—determine the inertial forces acting on the rider and thus his sensory impressions and feeling of movement. For example, if a rider is accelerated with 1 g counter to the direction of gravity, gravitational acceleration and the acceleration relative to the inertial system cancel; no g-forces act on the subjectively weightless rider.

The acceleration variable can additionally include or be an acceleration duration. G-forces of different magnitudes may occur physiologically for different time durations: while 10 g's normally already lead to a blackout in less than one second, for example, according to a relevant standard 6 g may occur for 1.0 s compared to 4 g for 2 s.

According to a first aspect of the present invention, the expected acceleration variable is an estimation of the movement before execution of this movement and then a comparison thereof is made with a predetermined acceleration variable.

For example, for this an acceleration of a reference system of the rider receptacle for a subsequent path segment—for example one or more following timing cycles of a manipulator controller—can be determined according to magnitude, direction and/or duration on the basis of a currently measured position and/or movement direction, a planned trajectory, drive forces, drive moments or drive outputs of the actuators, a pose and/or inertia of the manipulator and the like.

A threatening overrun of permissible limit values for the acceleration variable can thus advantageously already be detected in advance and corresponding measures can be taken. For example, the manipulator can travel more slowly along a predetermined trajectory, a preplanned (partial) trajectory can be re-planned or the manipulator can be stopped more gently. Additionally or alternatively, the occurring acceleration value can be determined during the movement.

According to a second aspect of the present invention that can be combined with the first aspect explained above, a predetermined acceleration variable has different permissible acceleration durations that are associated with different acceleration values.

The manipulator is brought to a stop if acceleration values longer than a maximum permissible time lie outside of a tolerance band around the reference values. However, this maximum permissible time is always of equal length. As noted previously, different accelerations can be physiologically tolerated for different lengths of time. Therefore different maximum time durations for different acceleration values are provided in some relevant standards.

The second aspect of the present invention accounts for this by acceleration variable with which an acceleration variable is composed of various acceptable acceleration durations that are respectively associated with different permissible acceleration values. The acceleration variable can be determined by means of one or more acceleration sensors for the current point in time, for example from detected joint positions, velocities and/or accelerations in the movement axes of the manipulator or is defined before execution of the of the movement according to the first aspect explained above.

For example, a suitable response can be made if an acceleration value determined in advance or during the movement exceeds a first threshold or limit value for a first predetermined maximum acceleration duration, or falls below a second threshold or limit value for a second predetermined acceleration duration that is then advantageously longer than the first predetermined maximum acceleration duration. The response can be, for example, that the manipulator travels more slowly along a predetermined trajectory, or a preplanned trajectory can be re-planned, or the manipulator can be stopped more gently. The second threshold or limit value can be smaller than the first threshold or limit value.

In a preferred embodiment of this aspect, the consideration of or, respectively, adherence to different acceleration combinations (aggregates) and the suitable linking of different thresholds and associated acceleration durations is possible. For example, every time a threshold is exceeded, a function (in particular a timer) can be initialized that checks whether the acceleration value falls below the threshold again within the associated permissible acceleration duration. For instance, multiple thresholds can be accounted for by monitoring different functions or resetting with corresponding abbreviation of the monitored acceleration duration. The frequency and/or correlation of the threshold overruns can also be taken into account.

According to a third aspect of the present invention that can be combined with the first and/or second aspect explained above, the movement is adapted to a predetermined acceleration variable in the event that the determined acceleration variable deviates from the predetermined acceleration variable.

Although in normal operating practice accelerations that are predetermined by the limitation of the drive outputs (in particular maximum permissible accelerations) normally do not occur, or occur only for shorter periods than desired (which is particularly unwanted in the field of entertainment), the potential of the manipulator can be better utilized through the adaptation of the movement to a predetermined acceleration variable according to the invention. However, in contrast to previous practice the manipulator is not necessarily brought to a stop if the determined acceleration variable deviates from the predetermined acceleration variable. Rather, a predetermined trajectory can be traversed, for example, more slowly or more quickly, or a preplanned trajectory can be re-planned, at least in part.

For this purpose, at least one acceleration variable is initially determined—for example it is measured for a current point in time by means of one or more acceleration sensors—or established—for example from detected joint positions, velocities and/or accelerations in the movement axes of the manipulator—and/or determined for at least one later point in time according to the explained first aspect, before execution of the movement.

The acceleration variable(s) are then compared with predetermined acceleration variable(s). For example, it can be established whether a maximum permissible acceleration value is currently exceeded or will be at a later point in time given a planned traversal of a trajectory. According to the second aspect, different maximum permissible acceleration durations during which different acceleration value levels may be reached or exceeded can thereby be advantageously taken into account.

In the event that one or more determined acceleration variables deviate too far from a predetermined acceleration variable, the movement of the manipulator is adapted to the predetermined acceleration variable.

This can ensue by regulating the movement on the basis of the determined acceleration variable in order to adapt it to the predetermined acceleration variable. For example, a predetermined trajectory can be traversed more slowly or quickly. For example, a path profile s=s(t) can be predetermined or changed such that, essentially, a predetermined absolute value $$\left|\frac{d^2 r}{dt^2}\right|_{soll}$$

of the acceleration of a reference point of the rider receptacle always results given traversal of the predetermined trajectory $(r(s_i), \psi(s_i))$ i=0, 1, ... with this time profile s(t):

$$\left|\frac{d^2 r}{dt^2}\right| = \left|\frac{\partial r}{\partial s}\cdot\left(\frac{ds}{dt}\right)^2 + \frac{\partial r}{\partial s}\cdot\frac{d^2 s}{dt^2}\right| = \left|\frac{d^2 r}{dt^2}\right|_{soll} \Rightarrow s(t)$$

This can similarly lead to a slower traversal of the trajectory, but also to a faster traversal. For example, if a g-force exceeds a limit value, the trajectory is advantageously directly traversed so slowly that the g-force is reduced to this limit value. If the limit value for the maximum permissible acceleration duration that is associated with it is thereby reached, the g-force can be reduced to a lower limit value with correspondingly longer maximum permissible acceleration duration.

In order to impart the sensory impressions that are desired in the field of entertainment, upon falling below a predetermined g-force the trajectory can conversely be presently traversed so quickly that the g-force is increased up to this limit value. A tolerance band within which the trajectory may or, respectively, should be traversed can be predetermined by provided a lower and upper limit for an acceleration variable.

For example, a preplanned trajectory can similarly be re-planned in order to achieve an appropriate reduction or increase of the g-forces that occur upon its traversal. For example, direction changes can be tightened—curve radii reduced, for instance—or eased—curve radii correspondingly increased, for example—so that the resulting centripetal, path and Coriolis accelerations yield the predetermined acceleration variable, possibly under consideration of the gravitational acceleration.

DESCRIPTION OF THE PREFERRED EMBODIMENTS

Figure 1:
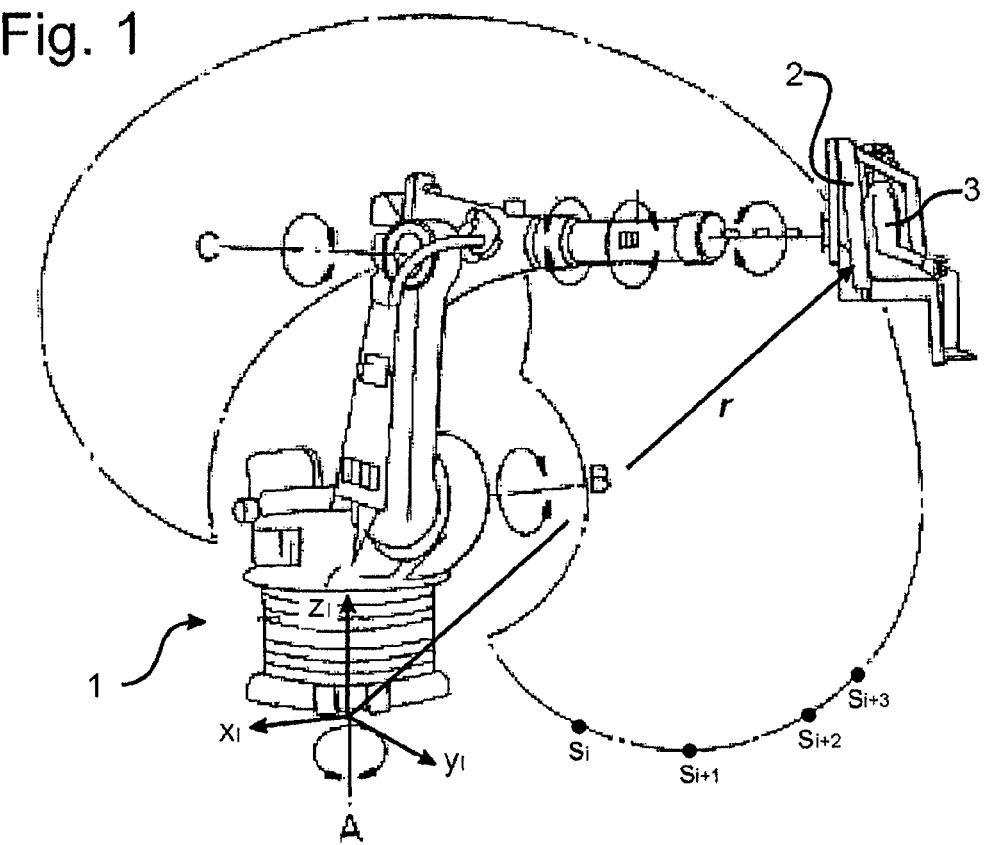
FIG. 1 shows a robot with a rider receptacle according to an embodiment of the present invention.

FIG. 1 shows a six-axle articulated arm robot 1 on whose tool flange a rider receptacle 2 for a person 3 is attached in order to move said person 3 on a trajectory or, respectively, path (drawn with a dash-dot line). This path can be described, for example, by the spatial vector r of a reference coordinate system of the rider receptacle 2 and its orientation ψ relative to a coordinate system $\{x_f, y_f, z_f\}$ that is fixed relative to the base, and be provided for this as a series of nodes $s_i$ ($r(s_i)$, $ψ(s_i)$). Four nodes $s_i$, $s_{i+1}$, $s_{i+2}$, $s_{i+3}$ that represent a discretization of a path parameter s→r(s) are drawn as an example in FIG. 1.

Upon traversing the path, an interpolator of the robot controller plans partial segments between the current node and one or more following nodes, for example as a point-to-point ("PTP") or circle segment ("CR") path. The robot controller then regulates drive motors of the robot 1 so that the rider receptacle 2 traverses the desired path, i.e. the nodes. When the individual nodes $s_i$ $s_{i+1}$, ... are reached depends on, among other things, the specification of the interpolator, the robot controller and the drive output of the motors of the robot 1.

Figure 2:
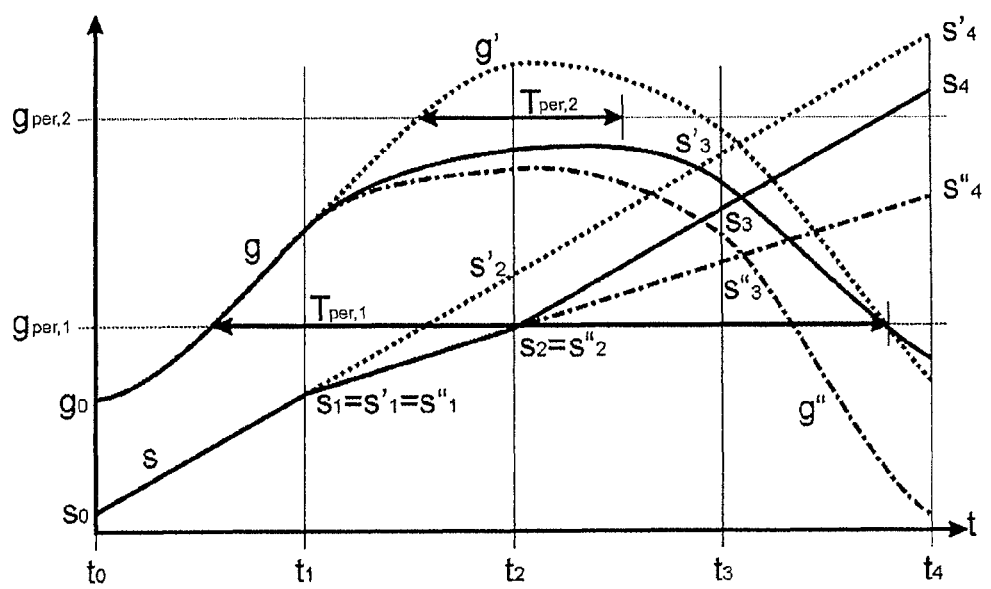
FIG. 2 illustrates path parameter profiles and associated acceleration value profiles over time.

FIG. 2 shows the curve of the path parameter s(t) and the acceleration g(t) over time t with five discrete points in time $t_0$, $t_i$, ... corresponding to a timing cycle of the interpolator.

At the point in time $t_0$, acceleration sensors in the rider receptacle 2 detect the absolute acceleration acting on the rider 3 as an acceleration value $g_0$. The interpolator initially plans the approach of the next nodes for the following timing cycles $[t_0, t_1]$, $[t_1, t_2]$, $[t_2, t_3]$ with a constant path speed s'(t) that is drawn in a dotted line in FIG. 2. At the point in time $t_1$, the rider receptacle 2 would thereby reach the point $s'_1$ on the trajectory drawn in a dash-dot line in FIG. 1, would reach the point $s'_2$ at the point in time $t_2$ etc.

In the robot controller a monitoring function is implemented which partially estimates an acceleration variable on the basis of the kinematic parameters (for example the axle intervals, the desired trajectory ($r(s_i)$, $ψ(s_i)$)) and the inertia parameters (for example mass, center of gravity position, inertia sensors) that are known in part in advance can be identified at the beginning of the movement, for example on the basis of the occurring drive forces and moments, which acceleration variable is namely an acceleration value g' (for example the magnitude of the spatial vector r differentiated twice according to time under consideration of gravitational acceleration); and the acceleration duration T is determined during which this acceleration value acts on the rider 3 if the desired trajectory with the planned path profile s'(t) would be traversed.

In the exemplary embodiment this monitoring function establishes that a first acceleration value threshold $g_{per,1}$ and a second, higher acceleration value threshold $g_{per,2}$ would be exceeded upon traversing this path profile s'(t) within the time horizon $[t_0, t_3]$ monitored in the interpolator.

Each of these acceleration thresholds $g_{per,i}$, (i=1, 2) is associated with a maximum permissible acceleration duration $T_{per,i}$ that indicates how long the respective acceleration threshold may be continuously exceeded at maximum. According to a relevant standard, the values can read $g_{per,1}$=4 g, $T_{per,1}$=2 s, $g_{per,2}$=6 g, $T_{per,2}$=1 s, for example. The maximum permissible acceleration durations $T_{per,i}$ are marked in FIG. 2 with overruns of the respective acceleration threshold $g_{per,i}$.

As is apparent from this, in the path planning the interpolator has already established in advance at the point in time $t_0$ that the acceleration variable determined in advance for this movement—namely the acceleration duration associated with the acceleration value g'—with the planned path profile s'(t) at a later point in time between $[t_2, t_3]$ would exceed a predetermined acceleration variable, namely the maximum permissible acceleration duration $T_{per,2}$ associated with the second acceleration threshold $g_{per,2}$, meaning that the rider 2 would be exposed to too high an acceleration for too long given this movement.

Therefore the interpolator adapts the movement to the predetermined acceleration variable by, for example, traversing the trajectory more slowly, i.e. selecting a path profile s"(t) that is drawn with a dash-dot line in FIG. 2. It is apparent that, according to this profile, a point $s"_i$ on the trajectory drawn with a dash-dot line in FIG. 1 that—according to the originally planned path profile s'(t)—lies before the corresponding point $s'_i$ in the travel direction is respectively reached at a point in time $t_i$ (i=1, 2, 3) or conversely the same node is only reached at a later time.

The acceleration values and durations accordingly also reduce, as is apparent from the associated curve of the acceleration g" (likewise drawn with a dash-dot line in FIG. 2), such that the maximum permissible acceleration duration $T_{per,2}$ is no longer exceeded.

In the next timing cycle, i.e. at the point in time $t_1$, the interpolator renews the approach of the next nodes for the timing cycles $[t_1, t_2]$, $[t_2, t_3]$ and $[t_3, t_4]$, as is indicated with a dash-dot line in FIG. 2. For this, as described in the preceding the monitoring function determines the acceleration variable (i.e. acceleration value g" and acceleration duration T) if the desired trajectory would be traversed with the planned path profile s"(t).

The monitoring function thereby establishes that—given a traversal of the path profile s"(t) within the time horizon $[t_1, t_4]$ monitored in the interpolator—the maximum permissible acceleration duration $T_{per,1}$ that is associated with the lower acceleration threshold $g_{per,1}$ would no longer be used.

The interpolator therefore adapts the movement to the predetermined acceleration variable in that it traverses the trajectory more quickly in this segment, i.e. selects a path profile s(t) that is drawn as a solid line in FIG. 2. It is apparent that, according to this profile, the acceleration values and durations increase again, as from the associated curve of the acceleration g that is likewise drawn with a solid line in FIG. 2, such that the maximum permissible acceleration duration $T_{per,1}$ is used.

By the advance determination of the acceleration variables g, T before traversal of the corresponding trajectory segment, the consideration of different permissible acceleration durations $T_{per,i}$ and the adaptation of the movement s'→s"→s to the predetermined acceleration variable, it can on the one hand be ensured that the rider 3 is not exposed for too long to stresses that are too high. On the other hand, a maximum riding enjoyment can be ensured by utilizing the permissible acceleration collectives.

While the trajectory as such remains unchanged in the exemplary embodiment and the interpolator suitably adapts only the path profile s(t), in a modification (not shown) the interpolator can also change the interpolation type between the nodes, insert additional (auxiliary) nodes and/or vary the nodes themselves. For example, the accelerations in the transitions can be reduced via the transition from a PTP path that is straight in parts in the work space to the blended CR path segments or can be increased by centrifugal and Coriolis components within the segments.

It is also apparent (in particular from FIG. 2) that—in a modification of the exemplary embodiment described in the preceding—the desired movement can also be achieved by, for example, the overrun of an acceleration threshold for at most one associated, permissible acceleration duration being considered as a (positive) quality criterion or amplification factor, and/or by exceeding an acceleration threshold for too long beyond an associated permissible acceleration duration is considered as a (negative) penalty function or negative feedback in a regulation algorithm that, for example, can be implemented in the robot controller. A corresponding regulator will accordingly control the movement so that the permissible accelerations are utilized in order to increase the rider enjoyment, as well as to prevent riders from being exposed for too long to too high accelerations. In a generalization of this embodiment, the movement is advantageously at least also regulated on the basis of a determined acceleration variable in order to adapt this to a predetermined acceleration variable. As used herein, regulation means a specification of manipulated variables with or without feedback of real variables and their comparison with desired variables.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method to move a person with an automated manipulator, comprising the steps of:
   with a multi-axis, automated manipulator having a rider receptacle adapted to receive a person, moving the person at the rider receptacle through a movement that produces acceleration experienced by the person at the rider receptacle during the movement;
   operating said manipulator to execute said movement from a computerized control unit in communication with the automated manipulator;
   providing said computerized control unit with a predetermined acceleration variable that represents a tolerable amount of said acceleration experienced by the person at the rider receptacle during the movement, said predetermined acceleration variable comprising a plurality of different permissible acceleration durations respectively associated with a plurality of different permissible acceleration values;
   in said computerized control unit, determining, at a time selected from the group consisting of before executing said movement and during execution of said movement, a determined acceleration variable that represents actual acceleration at said rider receptacle produced by said movement; and
   from said computerized control unit, dynamically adapting execution of said movement, during said movement, to continually make said determined acceleration variable substantially conform to said predetermined acceleration variable during said movement.

2. The method as claimed in claim 1 comprising continually substantially conforming said determined acceleration variable to said predetermined acceleration variable by, in said computerized control unit, comparing said determined acceleration value to said predetermined acceleration value to identify a deviation therebetween, and regulating said movement from said computerized control unit to minimize said deviation.

3. The method as claimed in claim 1 wherein said movement is a pre-planned movement that is provided to said computerized control unit and comprising continuously substantially conforming said determined acceleration variable to said predetermined acceleration variable by, from said computerized control unit, causing at least a portion of said movement to be executed more slowly or more quickly than in said pre-planned movement.

4. The method as claimed in claim 1 wherein said movement is defined by a trajectory of said rider receptacle that comprises an associated interpolation type and a plurality of trajectory nodes, and comprising continually substantially conforming said determined acceleration variable to said predetermined acceleration variable by, from said computerized control unit, modifying said trajectory by a modification selected from the group consisting of changing said interpolation type, adding a further trajectory node to said plurality of trajectory nodes, removing at least one of said plurality of trajectory nodes, and displacing at least one of said plurality of trajectory nodes.

5. The method as claimed in claim 1 comprising, while continually substantially conforming said determined acceleration variable to said predetermined acceleration variable, causing a predetermined acceleration value of said rider receptacle to occur.

6. The method as claimed in claim 1 comprising, while continually substantially conforming said determined acceleration variable to said predetermined acceleration variable, causing a predetermined acceleration value to be exceeded during an associated predetermined acceleration duration.

7. The method as claimed in claim 1 wherein said manipulator comprises a plurality of movable components each operated by an actuator, and comprising continually substantially conforming said determined acceleration variable to said predetermined acceleration variable by, from said computerized control unit, selectively individually controlling movement of each actuator.

8. The method as claimed in claim 1 comprising determining said predetermined acceleration variable by operating said manipulator with said computerized control unit with no person in said rider receptacle, in advance of operating said manipulator to execute said movement with the person at the rider receptacle.

9. An automated manipulator system, comprising:
   a multi-axis, automated manipulator having a rider receptacle adapted to receive a person;
   a computerized control unit in communication with the automated manipulator configured to operate said manipulator to execute a movement that moves the person at the rider receptacle and that produces acceleration experienced by the person at the rider receptacle during the movement;
   said computerized control unit having an input supplied with a predetermined acceleration variable that represents a tolerable amount of said acceleration experienced by the person at the rider receptacle during the movement;
   said computerized control unit being configured to determine, at a time selected from the group consisting of before executing said movement and during execution of said movement, a determined acceleration variable that represents actual acceleration at said rider receptacle produced by said movement, said predetermined acceleration variable comprising a plurality of different permissible acceleration durations respectively associated with a plurality of different permissible acceleration values; and
   said computerized control unit being configured to dynamically adapt execution of said movement, during said movement, to continually make said determined acceleration variable substantially conform to said predetermined acceleration variable.

10. The automated manipulator system as claimed in claim 9 wherein said multi-axis automated manipulator is a robotic manipulator.

11. The automated manipulator system as claimed in claim 9 comprising at least one acceleration sensor mounted to said manipulator that detects acceleration at said rider receptacle and emits a sensor output corresponding to the detected acceleration, said acceleration sensor being in communication with said computerized control unit and supplying said sensor output thereto, and said computerized control unit using the sensor output supplied thereto as said determined acceleration variable.

12. A non-transitory, computer-readable storage medium encoded with programming instructions, said storage medium being loadable into a computerized control unit that operates a multi-axis automated manipulator having a rider receptacle adapted to accept a person, said programming instructions, when said storage medium in loaded into said computerized control unit, causing said computerized control unit to:

operate said manipulator to move the person at the rider receptacle through a movement that produces acceleration experienced by the person at the rider receptacle during the movement;

store a predetermined acceleration variable that represents a tolerable amount of said acceleration experienced by the person at the rider receptacle during the movement, said predetermined acceleration variable comprising a plurality of different permissible acceleration durations respectively associated with a plurality of different permissible acceleration values;

determine, at a time selected from the group consisting of before executing said movement and during execution of said movement, a determined acceleration variable that represents actual acceleration at said rider receptacle produced by said movement; and dynamically adapt execution of said movement, during said movement, to continually make said determined acceleration variable substantially conform to said predetermined acceleration variable.

\* \* \* \* \*